July 2, 1968     A. B. MILLER ET AL     3,390,852
FLEXIBLE WING VEHICLE
Filed July 1, 1966          8 Sheets-Sheet 1
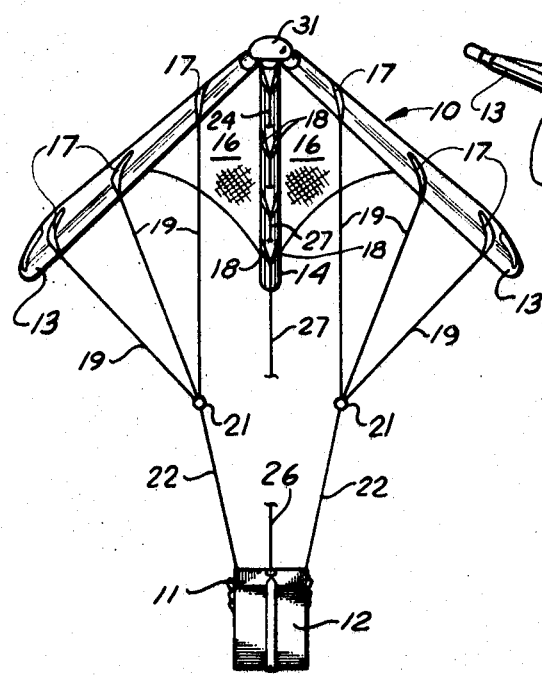
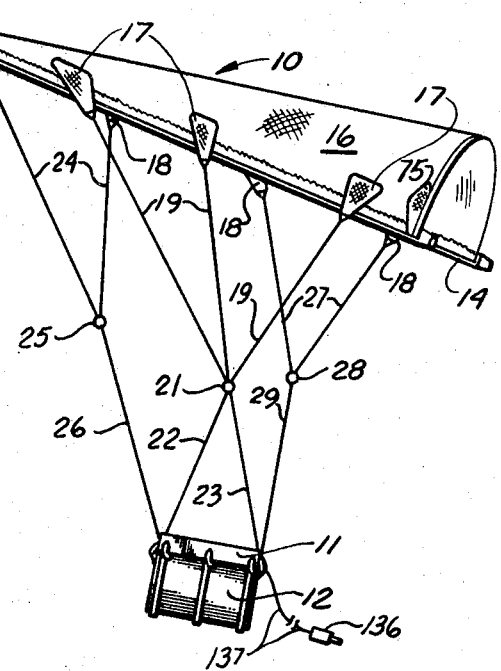
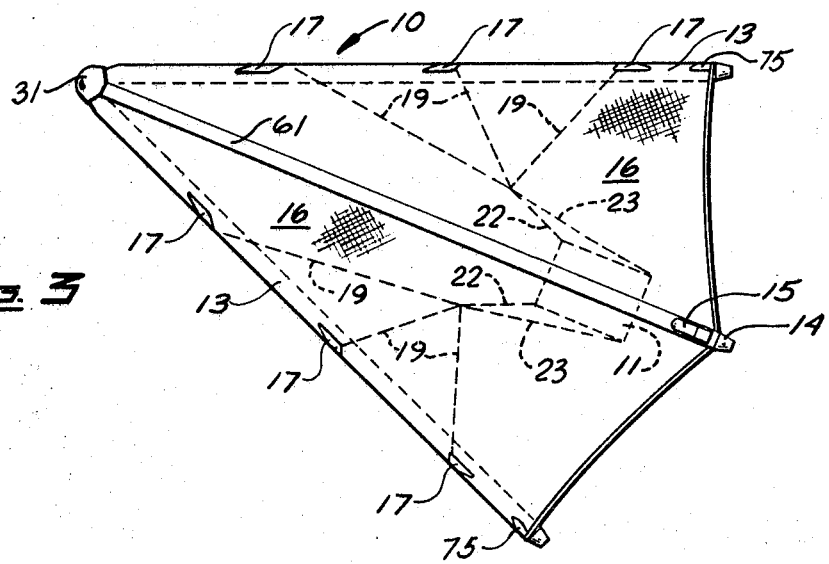
INVENTORS.
ALAN F. CUMMINGS
ARCHIE B. MILLER
WALLACE T. NEAL
HARRY E. ROLLINS
By Richard D. Seibel
ATTORNEY July 2, 1968  A. B. MILLER ET AL  3,390,852
FLEXIBLE WING VEHICLE
Filed July 1, 1966  8 Sheets-Sheet 2
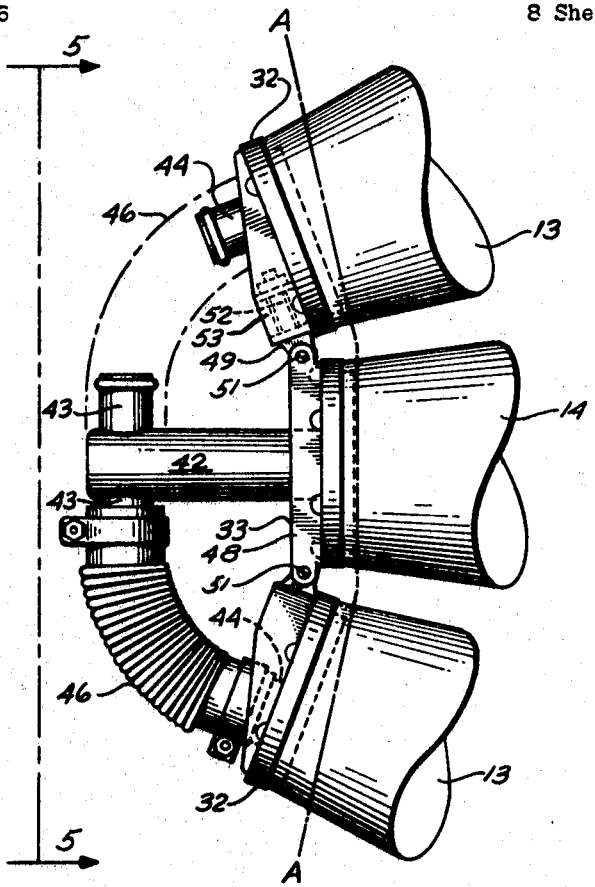
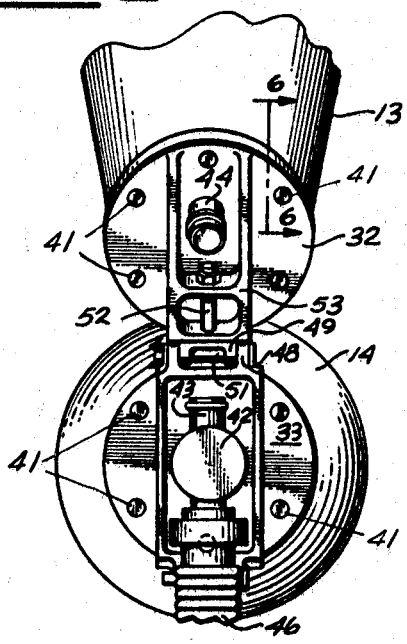
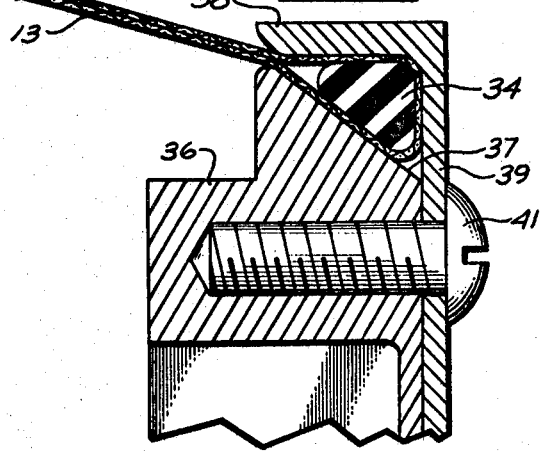
INVENTORS.
ALAN F. CUMMINGS
ARCHIE B. MILLER
WALLACE T. NEAL
BY HARRY E. ROLLINS
Richard D. Seibel
ATTORNEY

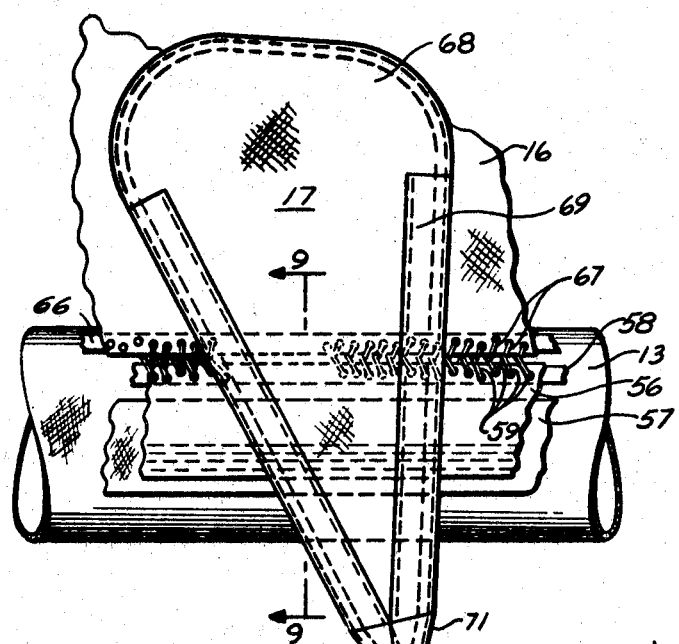
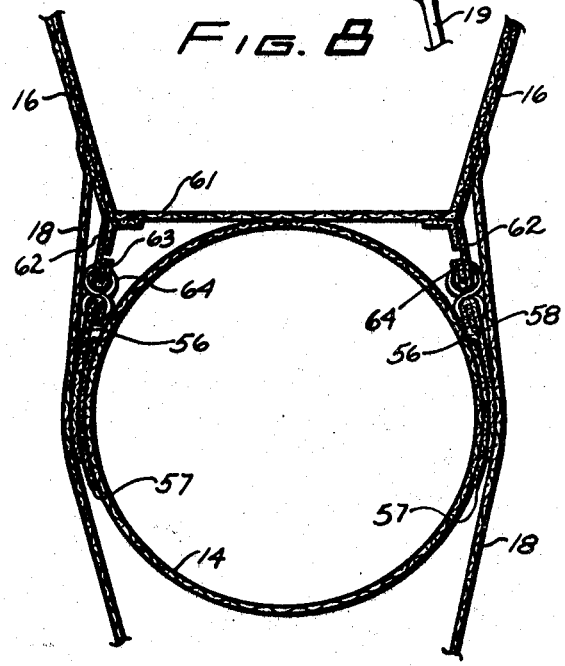
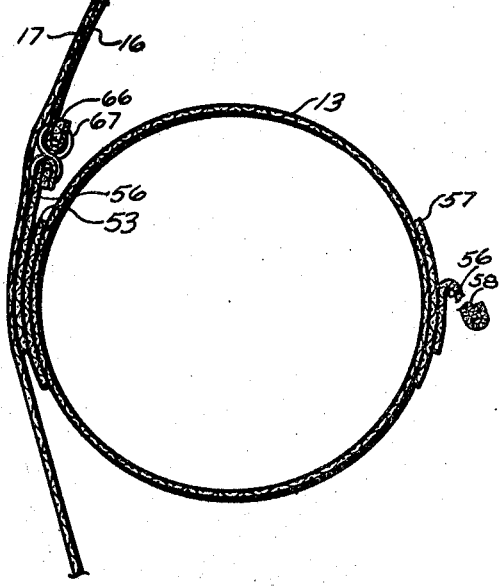

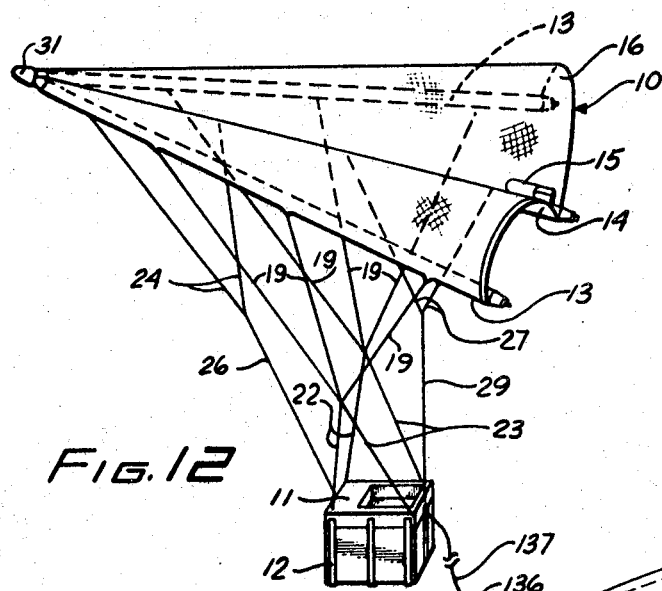
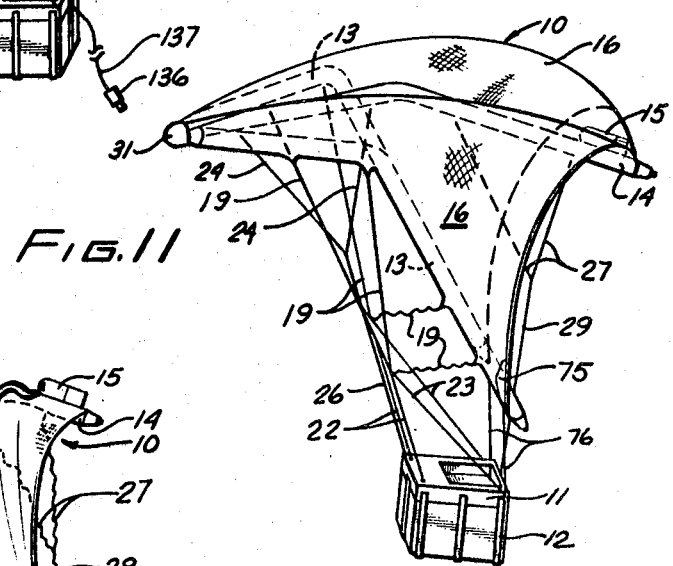
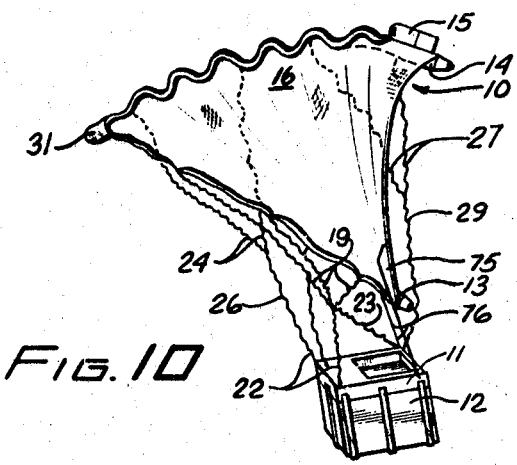

INVENTORS.
ALAN F. CUMMINGS
ARCHIE B. MILLER
WALLACE T. NEAL
By HARRY E. ROLLINS

Richard D. Seibel
ATTORNEY

July 2, 1968     A. B. MILLER ET AL     3,390,852
FLEXIBLE WING VEHICLE
Filed July 1, 1966     8 Sheets-Sheet 6
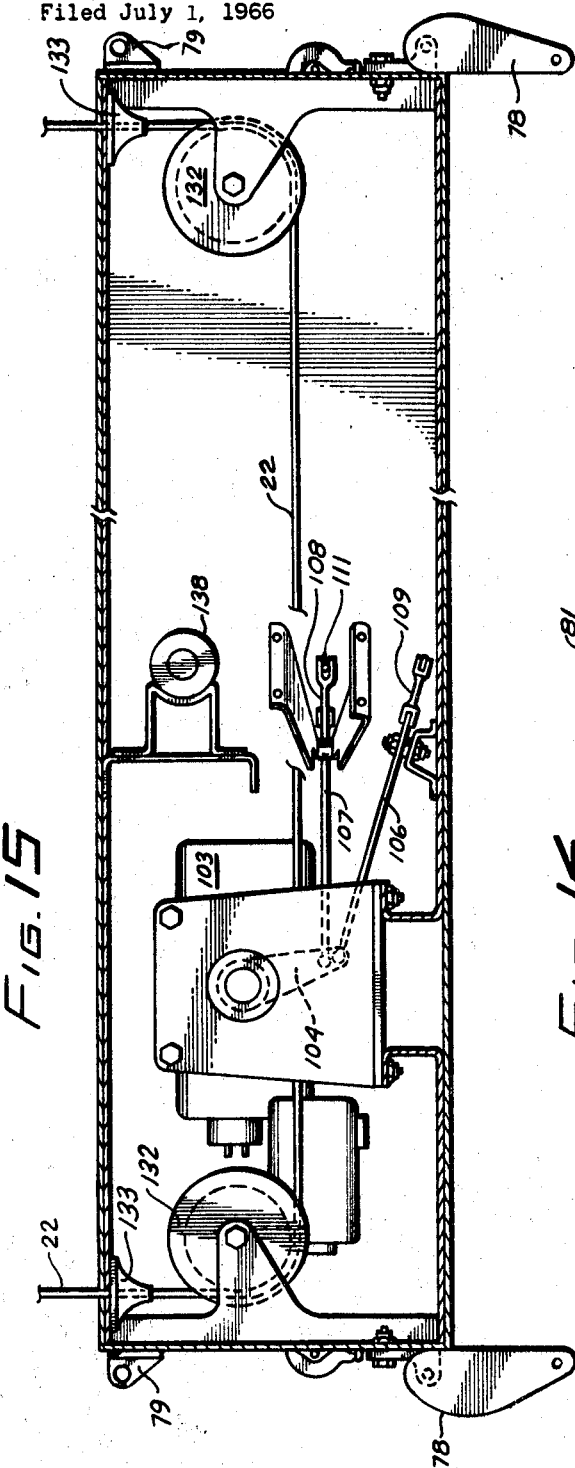
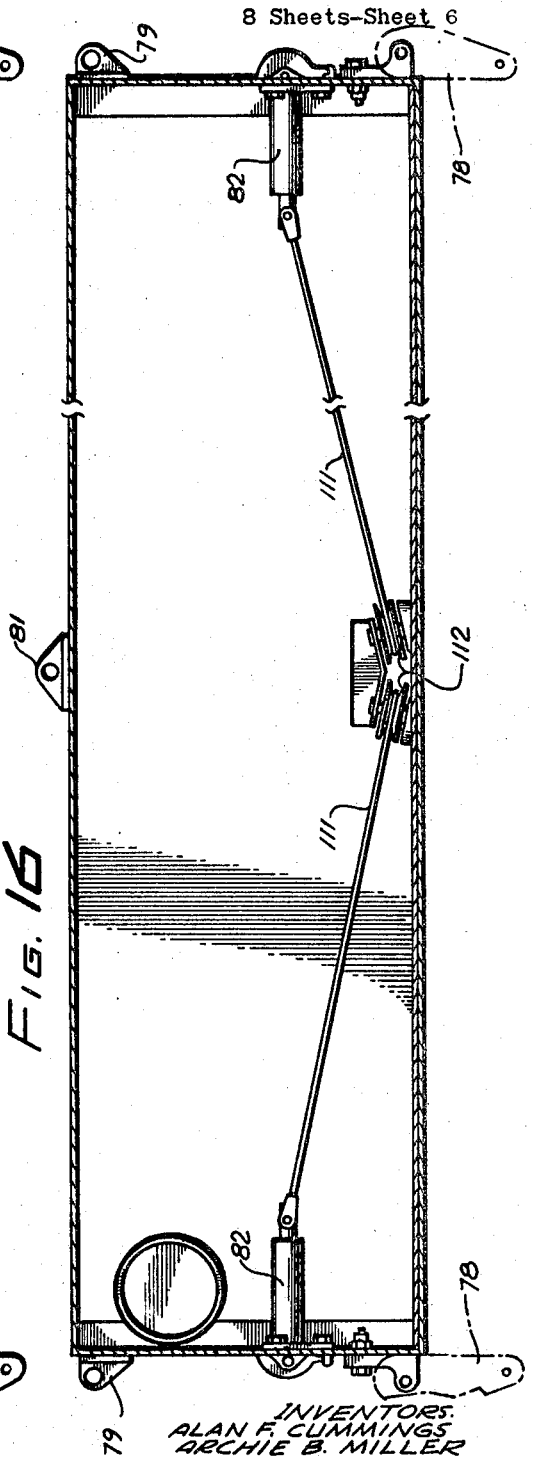
INVENTORS.
ALAN F. CUMMINGS
ARCHIE B. MILLER
WALLACE T. NEAL
HARRY E. ROLLINS
By Richard D. Seibel
ATTORNEY

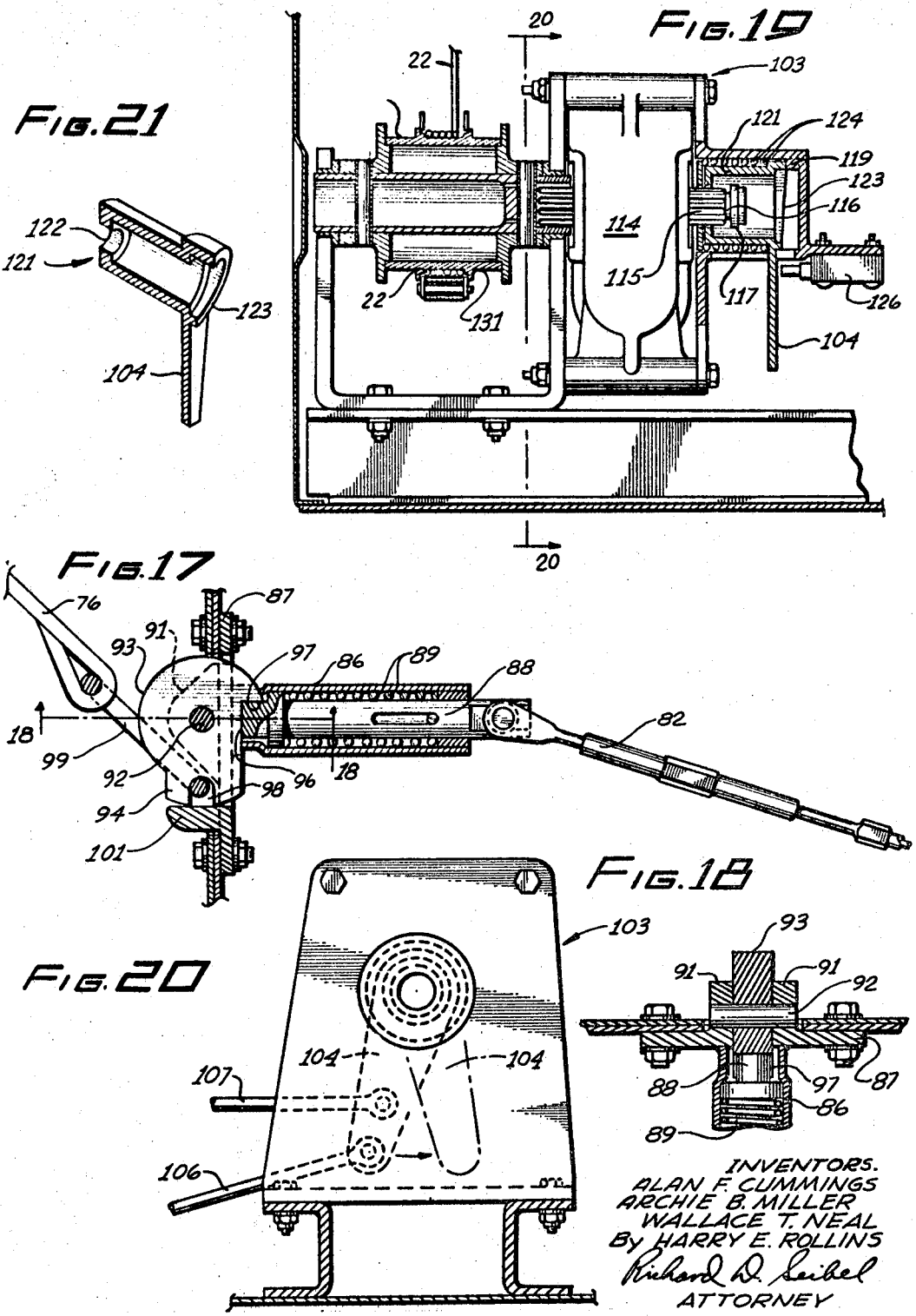

July 2, 1968  A. B. MILLER ET AL  3,390,852
FLEXIBLE WING VEHICLE

Filed July 1, 1966  8 Sheets-Sheet 8

INVENTORS
ALAN F. CUMMINGS
ARCHIE B. MILLER
BY WALLACE T. NEAL
HARRY E. ROLLINS

Richard D. Seibel
ATTORNEY

United States Patent Office

3,390,852
Patented July 2, 1968

3,390,852
FLEXIBLE WING VEHICLE
Archie B. Miller, La Habra, Alan F. Cummings, Downey, Wallace T. Neal, Torrance, and Harry E. Rollins, Fullerton, Calif., assignors to North American Rockwell Corporation, a corporation of Delaware
Filed July 1, 1966, Ser. No. 562,139
15 Claims. (Cl. 244—45)

ABSTRACT OF THE DISCLOSURE

A flexible wing vehicle is described having three flexible inflatable booms interconnected at an apex at one end to form a rigidifiable trifurcated frame. A fabric sail is connected by compliant laced connections to the frame for providing an aerodynamic lifting surface. A payload is suspended by riser lines below the wing and the entire vehicle can be flown with good lift-over-drag.

Riser lines are connected to spaced points along the inflatable booms and link lines are connected to spaced points on the payload. The riser lines are connected directly to the sail via fabric gussets for avoiding point loading on the frame. Sets of link lines and riser lines from a boom have a common interconnection point between the wing member and the payload so that the angle between the payload and each boom can vary without changing the shape of the array of riser lines. This provides a means for steering the vehicle by selectively controlling the length of the link lines between the interconnection point and the payload, and thereby warping the wing.

The apex includes means for providing universal angular motion between the booms for permitting each boom to move as a unit for minimizing bending stresses thereon. A rigid end closure for the flexible booms is described. A technique is described for deploying the flexible wing from a compartment on the payload so that the wing acts in the general manner of a parachute during some stages of deployment and acts as a gliding vehicle after full deployment. Latching and controlling mechanisms on the payload are described for reefing during deployment and for controlling the length of the link lines for roll and pitch control.

---

This invention relates to a flexible wing vehicle and in particular relates to means for supporting a payload from a flexible wing having a trifurcated rigidifiable frame for minimizing bending loads on the rigidifiable frame and for improving the flight stability of the vehicle.

In recent years considerable interest has been shown in flexible wing vehicles for providing gliding flight in the atmosphere. Such vehicles are employed for landing payloads from an aircraft, for example, at a selected site by controlling the glide path of the vehicle to the site. The angle of attack of such a vehicle is controlled for control of the flight range and the bilateral symmetry of the vehicle is modified in flight to provide steering. In such vehicles it is common to provide a rigid or rigidifiable frame having a flexible sail attached thereto for providing lift. In order to keep the size and weight of the frame at low values it is important to minimize localized bending loads on the frame. It is also desirable to minimize the complexity of riser line connections between the flexible wing and a payload suspended below the wing in order to simplify control of the vehicle. These desiderata have been mutually inconsistent since in general a larger number of riser lines than needed for control are required in order to support the payload with minimized local loads on the frame.

It is therefore a broad object of this invention to provide an improved aerodynamic vehicle.

Thus in the practice of this invention according to a preferred embodiment there is provided an inflatable trifurcated frame having a flexible sail attached between the branches thereof to form an aerodynamic body or wing. A payload is suspended from the aerodynamic body by a plurality of riser lines secured therebetween. The frame of the aerodynamic body is formed by three elongated inflatable booms interconnected at the forward apex of the aerodynamic body to form a crowfoot shape with two leading edge booms and a keel boom therebetween. Riser lines are attached to the wing adjacent each of the leading edge booms and adjacent the keel boom. The risers from the leading edge booms are interconnected at a single point between the wing and the payload and this point is in turn connected to the payload. A portion of the riser lines along the keel boom are connected to the forward end of the payload and another portion of the riser lines along the keel are attached to the rearward end of the payload. The interconnection of the leading edge and keel booms at the forward apex of the vehicle includes hinge-like members that permit relative articulation of the three booms both within a common plane and out of a common plane containing the three booms, so that the flexible wing can be distorted for steering. The riser lines are attached to the sail by means of fabric gussets that distribute the load over an appreciable area on the sail. The booms are attached to the sail by means of compliant lacing.

The combined effect of these features is to provide a flexible wing vehicle with a minimal bending moment on the booms. The point loads of the riser lines are distributed in the sail by the fabric gussets and the sail serves to further distribute these loads by way of the compliant lacing into the booms. The articulated apex and the common interconnection of the leading edge riser lines accommodate changes in the relative positions of the payload and wing with a minimum variation in bending moment on the booms. By bringing all of the riser lines from the leading edge booms to a single point above the payload, roll control of the vehicle can be obtained by variation in riser line length and hence relative position of the booms without changing the bending moment on the leading edge booms by any significant amount. Means are provided on the payload for adjusting the relative length of the riser lines for aerodynamic control of the wing by changing the geometry thereof. This affects steering for bringing the vehicle to a controlled landing.

Thus it is a broad object of this invention to provide an improved aerodynamic vehicle.

It is another object of this invention to provide a riser line arrangement for a flexible wing vehicle.

It is still another object of this invention to provide means for distorting a flexible wing vehicle for steering.

It is a further object of this invention to minimize bending moments on the rigidifiable frame of a flexible wing vehicle.

Other objects and many of the attendant advantages of this invention will be readily appreciated as the same becomes better understood by reference to the following detailed description when considered in connection with the accompanying drawings wherein:

FIG. 1 illustrates a front view of a vehicle constructed according to the principles of this invention;

FIG. 2 illustrates a side view of the vehicle of FIG. 1;

FIG. 3 illustrates a top view of the vehicle of FIG. 1;

FIG. 4 illustrates a detailed view of the apex connection of the vehicle of FIG. 1;

FIG. 5 is a partial front view of the apex connection of FIG. 4;

FIG. 6 is a partial cross-section of the connection between an inflatable boom and a rigid end fitting;

FIG. 7 illustrates a detailed view of a portion of one of the leading edge booms of the vehicle of FIG. 1;

FIG. 8 is a cross-section of the keel boom of the vehicle of FIG. 1;

FIG. 9 is a cross-section of a leading edge boom of the vehicle of FIG. 1;

FIG. 10 illustrates a flexible wing vehicle during unfolding while being deployed;

FIG. 11 shows the vehicle of FIG. 10 after the booms are inflated;

FIG. 12 shows the vehicle of FIG. 10 as fully deployed for gliding flight;

FIG. 15 is a front cross-section of the payload supporting platform;

FIG. 16 is an aft cross-section of the payload supporting platform;

FIG. 17 is a cross-section of a cable latch on the payload supporting member of FIG. 10;

FIG. 18 is a partial bottom view of the latch of FIG. 17;

FIG. 19 is a cross-section of a control mechanism for dereefing and roll control for the vehicle of FIG. 1;

FIG. 20 is an end view of the control mechanism;

FIG. 21 is a detail of a portion of the control mechanism;

Throughout the drawings like numerals refer to like parts.

Figure 13:
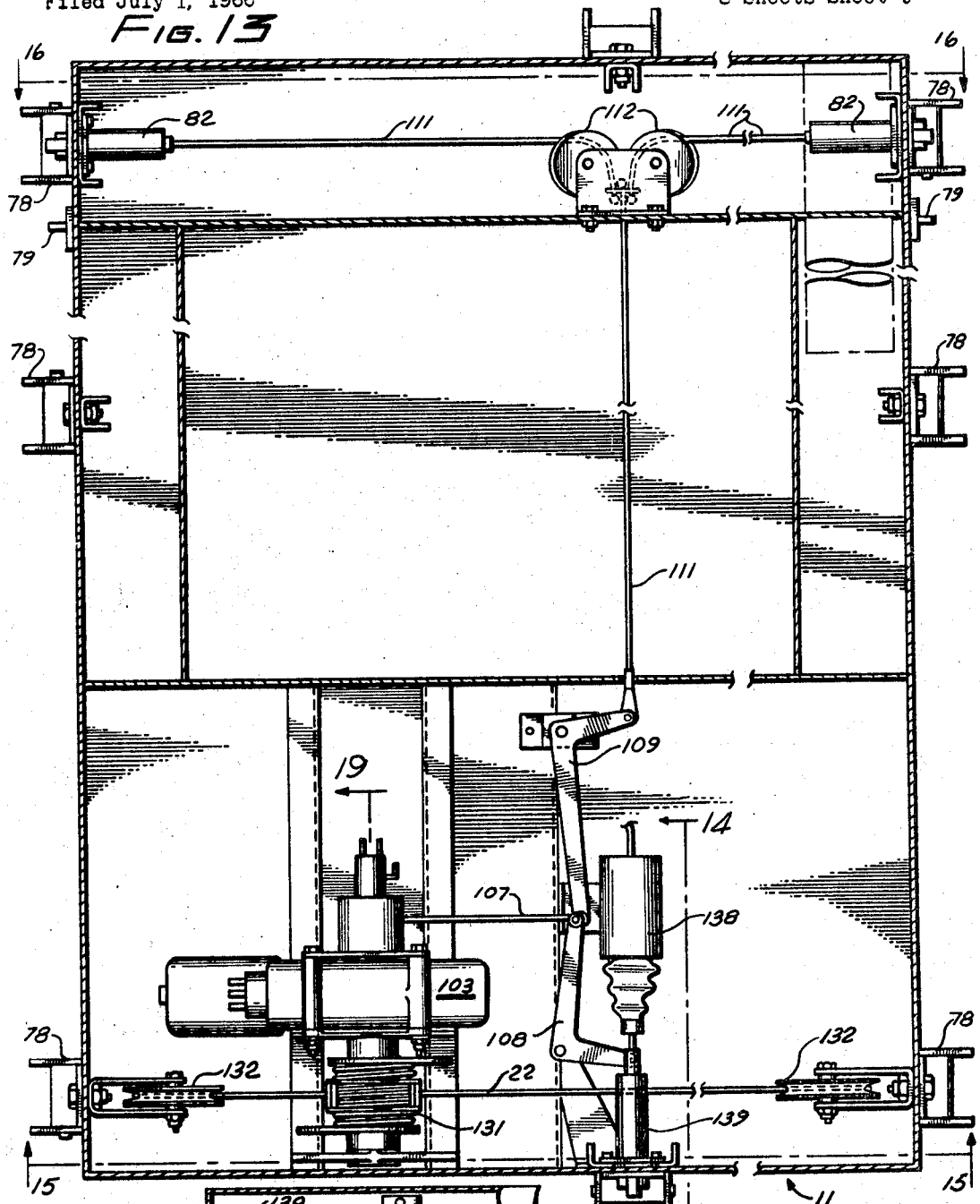
FIG. 13 illustrates a top cross-section of a payload supporting platform.

FIG. 1 illustrates an aerodynamic vehicle incorporating the principles of this invention. As illustrates in this embodiment there is provided a flexible wing 10 from which is suspended a control platform 11 to which is secured a payload 12 by conventional straps or the like. The flexible wing 10 comprises a trifurcated frame having two inflatable leading edge booms 13 and an inflatable keel boom 14 therebetween in a substantially crowfoot shape with three branches. The two leading edge booms 13 and the keel boom 14 are attached together at the leading end of the flexible wing and diverge toward the trailing end thereof. In the illustrated embodiment each of the booms 13 and 14 comprises a rubberized fabric tube which is flexible when deflated and rigidified upon inflation. During gliding flight the booms 13 and 14 are inflated to a sufficient pressure to remain rigid under aerodynamic loads encountered, that is about 15 p.s.i. A conventional stored gas inflation system 15 or gas generator is located on top of the keel boom 14 at the aft end thereof for inflating the booms.

A fabric sail 16 is secured between each of the leading edge booms 13 and the keel boom 14. The sail is preferably 1.9 oz./sq. yard rip-stop nylon with two to four small darts in the trailing edge to provide a slightly higher unit loading on this portion of the sail to reduce trailing edge flutter. Under aerodynamic loading the sail 16 forms high arching lobes between the rigid booms and supports the vehicle in the atmosphere. By trimming the wing to have a positive angle of attack, a good lift over drag ratio, in the order of 3:1, is obtained for prolonged gliding flight and gentle landing of payloads. A rate of descent of less than 15 feet per second is readily obtained. Three leading edge gussets or splice sheets 17 are secured directly to the sail 16 adjacent each leading edge boom 13. Similarly four keel gussets 18 are secured directly to the sail along each side of the keel boom 14. The keel gussets are secured in pairs with one on either side of the keel boom to maintain bilateral symmetry of the wing and keep loading on the flexible wing symmetrical.

*Riser lines*

Suspension or riser lines are provided between the sail gussets 17 and 18 and the payload supporting member or control platform 11. Braided nylon cord with a tensile strength of 2,000 pounds is found capable of withstanding all forces normally occurring in a vehicle with a 500 pound payload ejected from an aircraft at 150 knots and altitudes up to 30,000 feet. Since the suspension line arrangements are symmetrical on either side of the vehicle, only a single set of leading edge riser lines is described herein. Three leading edge riser lines 19 each have one end secured to one of the three leading edge gussets 17 and the other end of each of the leading edge riser lines 19 is secured to a ring 21 that is between the flexible wing 10 and the payload supporting member 11. A forward leading edge link line 22 interconnects the ring 21 and a forward corner of the control platform 11. An aft leading edge link line 23 interconnects the ring 21 and an aft corner of the control platform 11. The ring 21 is approximately 60 percent of the payload to wing distance below the wing.

Two forward keel riser lines 24 each have one end secure to one of two pairs of the keel gussets 18. The other ends of the two forward keel riser lines 24 are connected to a ring 25 about one-third of the total distance between the wing and the payload below the wing. The ring 25 is in turn connected to the forward end of the control platform 11 by a forward link line 26. Two aft keel riser lines 27 each have one end secured to one of two pairs of keel gussets 18 and the other ends of the aft keel riser lines are secured to a ring 28 which is about one-third of the total distance between the wing and the payload below the wing. The ring 28 is in turn connected to the aft end of the control platform 11 by an aft link line 29. The keel riser lines 24 and 25 and the forward and aft link lines 26 and 29 respectively are symmetrically located on the center line of the wing and the longitudinal center line of the payload suporting member 11.

The leading edge booms, suspension lines, and control platform are arranged to provide two triangular networks of risers for full stability throughout control maneuvers as described in detail hereinafter subsequent to a detailed description of the structural arrangement of the vehicle and the control mechanisms. Thus the three leading riser lines 19 and the corresponding leading edge boom 13 are in a triangular array and so long as the lines all stay in tension and the boom does not buckle, the array can be considered as a rigid body moving as a unit. The same is true of the triangular array formed by the forward leading edge link line 22, the aft leading edge link line 23 and the control platform 11. These two triangular arrays are joined at corners at the ring 21 and it can be seen that there is complete freedom of the payload to swing back and forth relative to the wing about the ring 21 except as restrained by the keel risers. The two triangular arrays of lines joined at a common corner also permits the leading edge boom to pivot laterally relative to the keel boom, as is more clearly pointed out hereinafter, without changing the bending moments on the boom by a significant amount. It will be apparent to one skilled in the art that additional riser lines can be provided between the ring 21 and the leading edge boom or that the riser lines 19 could be forked above the ring to provide more attachment points to the boom. Such an arrangement of lines in a triangular fan does not alter the principle of the riser line arrangement and may reduce the span along the boom between risers if so desired.

A triangular arrangement of lines between the ring 21 and the payload is preferred for control of the vehicle during flight as hereinafter described. A single control line between the ring and each side of the payload could only effect a shift in the center of gravity relative to the wing and not the change of the geometry or distortion of the wing as pointed out hereinafter. The use of two lines as illustrated also assures the relative loads on the two keel lines will be known and of substantially constant magnitude throughout flight. If but one line were employed normal variations in the location of the center of gravity of the payload could effect drastic changes in riser line loading.

One of the principal locations for high bending moments in a trifurcated gliding vehicle such as illustrated is at the forward apex where the three booms are interconnected. In prior art vehicles of the general type described and illustrated, a substantially rigid interconnection between the booms at the apex has been employed. This in effect makes the flexible wing vehicle a rigid framework on which a flexible sail is secured. However, as an aerodynamic vehicle of the type described and illustrated glides and undergoes various pitching and rolling maneuvers, the aerodynamic load on the sail changes in magnitude and distribution. It is preferable under these conditions that the sail which forms arching lobes between the booms "breathes." When the sail breathes there is a change in height of the lobes and necessarily a change in the angle between the booms. Similarly when the aerodynamic vehicle turns or banks in flight the aerodynamic load on the portion of the sail between one leading edge boom and the keel boom is different from the aerodynamic load on the opposite portion. This may cause the leading edge booms to rise or fall relative to the keel boom in a manner that may not be symmetrical on either side of the keel boom, that is the three booms may no longer lie in a common plane. Such motions are readily accommodated by interconnecting the booms for mutual articulation by means of pin joints between each of the leading edge booms and the keel boom so that no bending moments are applied at the ends of the booms.

Thus in a preferred embodiment the keel boom 14 is connected to the two leading edge booms 13 by an interconnection that permits articulation in each of two mutually angulated directions and provides pneumatic connection between the booms. FIGS. 4 and 5 illustrate an articulated apex connection wherein the apex protective cover 31 shown in FIGS. 1–3 has been removed for purposes of illustration. Line A—A in FIG. 4 indicates the rearward extent of the protective cover 31 which is preferably formed in a smooth aerodynamic shape and installed on the wing by conventional straps or lacing (not shown) to permit easy access to the end closures and gas manifold hereinafter described.

*Boom end closures*

Each of the leading edge booms 13 terminates in a rigid lateral end closure 32. The keel boom 14 terminates in a rigid central end closure 33. The rigid end closures 32 and 33 are each secured to the flexible inflatable booms 13 and 14 respectively as is illustrated in more detail in FIG. 6 which illustrates a typical interconnection between a leading edge boom 13 and a lateral end closure 32.

In a preferred embodiment the boom for a pressurized flexible cylindrical tube is constructed from conventional rubberized fabric so that leakage through the walls of the tube is minimized. The tube preferably is provided with a truncated conical section at the end thereof for attachment to the rigid end closure. The smaller end of the conical section includes a peripheral enlargement which is preferably made by wrapping a portion of the fabric in the conical section around a rubber O-ring 34. The rubberized fabric is then cemented or stitched in place around the rubber O-ring to provide a resilient and relatively smooth surfaced end enlargement at the periphery of the flexible tube. A rigid plate 36 which in a preferred embodiment is made from aluminum, is fitted within the end of the flexible boom. The rigid plate 36 has an external diameter to provide a relatively close fit within the inside of the conical section of the flexible boom near the end enlargement. The outside diameter of the metal plate 36 is preferably larger than the inside diameter of the resilient O-ring 34 for good sealing. A chamfer 37 is provided on the metal plate 36 around the periphery thereof.

The chamfer in a preferred embodiment extends between the outer diameter of the plate to one face thereof at about a 45° angle and serves as a seat for the peripheral enlargement formed by the O-ring 34.

A rigid ring 38 is fitted over the external diameter of the metal plate and has an internal diameter greater than the external diameter of the plate 36 with sufficient clearance for the double thickness of fabric at the end of the boom. An integral annular flange 39 extends inwardly on one side of the ring 38 and is secured to the metal plate 36 by a series of bolts 41. The ring 38 and flange 39 and the chamfer 37 on the plate cooperate to define a peripheral enclosure therebetween. The enclosure has a substantially triangular cross-section that is smaller than a triangle that would exactly circumscribe a circle having the cross-sectional diameter of the O-ring so as to deform the normally circular O-ring into a flattened three-sided figure when the O-ring is contained within the peripheral enclosure and the flange 39 is pulled toward the plate by the bolts 41. An end closure of this type is described and claimed in copending patent application Ser. No. 535,405 entitled "Flexible Structure Closure" by W. J. Dailey and A. B. Miller and assigned to North American Aviation, Inc., the assignee of this invention.

*Deployment*

In deploying a flexible wing vehicle of the type described and illustrated, it is preferred to unfold a packed wing by inflating the keel boom and subsequently inflating the two leading edge booms. In order to accomplish this, gas is admitted to the aft end of the keel boom from the pressurization system 15 at a selected rate which serves to unfold the keel boom in an orderly manner. After the keel boom inflation has progressed forward, much, if not all, of the way to the apex, gas commences to flow into the leading edge booms by way of a flow limiting pneumatic connection hereinafter described. Because of the limited flow, the keel boom is fully inflated during deployment before the leading edge booms are fully inflated. Additional details of a method and apparatus for deployment of a flexible wing vehicle are described and claimed in U.S. patent application Ser. No. 562,226, entitled, "Method of Deploying a Flexible Wing Vehicle," by H. E. Rollins and assigned to North American Aviation, Inc., the assignee of this invention.

Deployment of a flexible wing vehicle commences, for example, by ejection of the payload and control platform 11 from a conventional aircraft. A static line or pilot parachute extracts the flexible wing from the control platform and initiates inflation of the booms on the flexible wing. The wing is preferably originally folded in a series of accordion folds across the keel boom. These folds limit the flow of gas along the length of the boom upon initial inflation. By folding the wing in this manner the unfolding is at a controlled rate set by the inflation of the booms rather than a rapid filling of the sail with air as the vehicle falls. Because of the orderly and relatively slow deployment by unfolding of the keel boom, the shock loads on the riser lines are minimized and tangling between the risers is avoided.

The inflation of the keel boom from the pressurization system 15 on the aft end thereof acts to unfold the transverse accordion folds in the wing beginning with the pleats nearest the aft end and progressing forward. Gas for inflation of the leading edge booms passes through the keel boom from the pressurization system on the aft end thereof to the forward apex of the vehicle and through the flow limiting gas manifold described hereinafter. Because of the flow limiting characteristics of the folded keel boom and the gas manifold, the keel boom is inflated to substantial rigidity before the leading edge booms are inflated, and deployment is controlled in an orderly manner instead of being subject to the vagaries of air collected during falling.

The inflation of the keel boom commences during the time when the wing is being snatched from the payload in the stage of deployment illustrated in FIG. 10 and continues after the riser lines are as fully extended as they can be in the reefed condition. During this stage of deployment the aft ends of the leading edge booms 13 and the forward end of the keel boom 14 are reefed to the control platform 11 and all other lines are free to subsequently extend to their length when loaded. The relative line lengths are such that the leading edge risers are nearly, but not quite fully extended during reefed inflation.

Boom reefing gussets 75 are attached to the sail 16 adjacent the aft ends of the leading edge booms 13. A short boom reefing line 76 is secured to each of the reefing gussets 75 and at the opposite end to the control platform 11 at the aft corners thereof. As the keel boom inflates and unfolds from the aft end air is scooped by the aft end air is scooped by the aft end of the sail, the corners of which are held apart by the boom reefing lines 76. This air fills the sail from the aft end concurrently with inflation of the keel boom and spreads the leading edge booms laterally from the keel boom. Since the scoop formed by the aft edge of the sail is relatively small and some air escapes from the other edges of the sail, the filling of the sail is relatively slow compared with parachute inflation and no sudden shock loads are generated. It is found that if filling of the sail occurs before the booms are inflated, the wing "flaps," thereby losing much of the air past the leading edge booms and avoiding shockloads.

The forward keel link line 26 is reefed during inflation of the booms so as to be about 12 to 18 inches shorter than the extended length employed in normal gliding flight. By reefing the aft ends of the leading edge booms and the forward keel risers, the wing is forced into a bonnet-like shape of generally M shaped transverse cross-section as illustrated in FIG. 11. The forward keel risers are reefed to hold the leading end apex of the wing downward in the bonnet shape in order to move the center of pressure forward and give a stable aerodynamic configuration to the vehicle.

The snatch forces and sail filling forces are accommodated by the riser lines along the keel and the aft boom reefing lines 76. The leading edge riser lines 19 between the payload supporting platform 11 and the leading edge booms are all slack up to and during the stage of deployment illustrated in FIG. 11.

After the pressure in the booms is at the operating pressure for gliding flight, about 15 p.s.i., the short boom reefing lines 76 are released and the forward keel riser lines are extended to full length by dereefing. A useful reefing and dereefing structure is described hereinafter in relation to FIGS. 13–21. Dereefing the wing permits the leading edge booms to pop outward and upward into a substantially straight shape under a combination of the aerodynamic loading and the inherent stiffness of inflated booms. The momentary release of the loads on the aft ends of the leading edge booms permits straightening during deployment with pressures no higher than required for normal gliding flight. After popping into a substantially straight shape, the booms are in a configuration substantially as shown in FIG. 12 with the sail forming high lobes between the rigid booms. In this condition the vehicle is trimmed for gliding flight and performs in a reliable and highly desirable manner.

Articulated apex

Referring again to FIGS. 4 and 5 for illustration of the pneumatic connection, the central end closure 33 has an axial tube 42 extending therefrom with a T connection 43 at the opposite end thereof. The tube 42 communicates with the interior of the keel boom 14 and is conveniently secured to and through a plate 36 rather than a flange 39 on the end closure. The internal diameter of the tube 42 is sized so as to give a selected flow rate of gas therethrough to control the relative inflation rates of the keel boom and the leading edge. A preselected constant diameter tube 33 is preferred because of the simplicity, however other flow limiting means such as a restrictive orifice can be employed in conjunction with the tube 33.

The two lateral end closures 32 each have a tube 44 extending from the plate through the flange of the end closure and communicating with the interior of the leading edge booms 13. The tubes 44 are preferably displaced from the axis of the leading edge booms to allow space for mechanical interconnection between the booms. A flexible tube 46 interconnects each of the tubes 44 on the lateral end closures with the T connection 43 on the central end closure to form a gas manifold. Thus the interior of the keel boom 14 is in gas communication with the interior of each of the leading edge booms 13. This provides a flow limiting pneumatic connection that permits orderly deployment of the wing. Because of the relatively small diameter of the flexible tube 46 compared with the booms, the flexible tubes 46 have a very small resistance to flexure and the three booms can mutually articulate with a minimum of resistance.

The three booms are interconnected for mutual articulation as illustrated in FIG. 4 and more clearly in FIG. 5. The central end closure 33 has a clevis frame 48 fixedly secured or integrally formed at either side thereof for interconnection to the leading edge booms. FIG. 5 illustrates the central end closure 33 and one of the lateral end closures 32 and it will be understood that an identical interconnection is made between the central end closure and the other lateral end closure. A clevis insert 49, which is attached to the lateral end closure 32 as described below, is fitted within the clevis frame 48 and fastened thereto by a clevis pin 51 so that the clevis insert can rotate or pivot relative to the clevis frame about an axis normal to the axis of the keel boom 14. The leading edge boom 13 is thus attached to the keel boom 14 by a hinge-like or pin joint and the angle between the booms is free to change about the axis of the pin 51 under varying flight conditions merely by pivoting about the pin joint. Since the booms are connected by a pin joint there is no moment transfer therebetween and no buckling problem.

The clevis insert 49 is a T shaped member having the clevis pin 51 passing through the upstanding ears on the top of the T and having a pivot pin 52 forming the leg of the T. The pivot pin 52 passes through and is journaled in a pivot frame 53 that is fixedly secured to the lateral end closure 32 preferably on a flange 39. The pivot frame 53 is free to rotate about the pivot pin 52 about an axis normal to the axis of the clevis pin 51. The leading edge boom 13 is thus attached to the keel boom 14 with two degrees of pivotal freedom by hinge-like or pin joints and the angle between the booms and the pitch of the booms is free to change under varying flight conditions merely by pivoting around the pin joints.

Details of an articulated apex are described and claimed in copending U.S. patent application Ser. No. 562,138, entitled, "Improvements for a Flexible Wing Vehicle Apex," by H. E. Rollins and assigned to North American Aviation, Inc., the assignee of this invention.

Boom construction

As has been mentioned above the riser lines are attached to gussets secured directly to the sail 16 rather than the booms themselves. The relative length of the riser lines is such that the flexible wing is substantially straight along its length and the booms proivde stiffness to straighten the sail edges between the risers and at the boom ends beyond the risers. Thus since the booms provide stiffness to portions of the sail rather than carrying loads from the sail to riser lines, the bending forces on the booms are minimized and small diameter low pressure inflatable booms can be employed. Leading edge booms lie along the edges of the vehicle and provide stiffness to the leading edge of the sail between the riser lines. The keel boom 14 helps provide substantial straightness along the length of the vehicle.

In a preferred embodiment the leading edge booms 13 and the keel boom 14 are substantially identical and for purposes of exposition a single boom will be described in detail. It will be understood, however, that such a boom can be used for either a leading boom or a keel boom. Additional details of the interconnection between the booms and the sail and between the sail and riser lines are described and claimed in copending U.S. patent application Ser. No. 562,137, entitled "Improvements for a Flexible Wing Vehicle" by H. L. Woodlief and assigned to North American Aviation, Inc., the assignee of this invention.

As is illustrated in FIGS. 7–9 a lacing portion is provided along the length of the typical boom on each side thereof. Each lacing portion comprises a nylon fabric lacing strip 56 that is stitched to a fabric bonding strip 57 with several rows of stitches. As illustrated in FIG. 7 the general location of the stitching on the strips, gusset and sail is by means of dashed lines, however, it should be understood that additional stitching may be empolyed as desired. The bonding strip 57 is in turn cemented along the length of the boom over an area larger than the area where the lacing strip is stitched to the bonding strip. An adhesive bond to the boom is preferred over stitching to minimize the potential of leakage at points where the thread would perforate the wall of the booms. The lacing strip 56 is secured to the bonding strip 57 by stitching along the length of the boom so that the point of possible application of peel loading tending to peel the strip from the boom has a stitched connection rather than an adhesive connection. The stitching is better able to resist any peeling tendencies that might destroy the adhesive bond. The lacing strip 56 has an edge doubled and stitched around a fabric reinforcing tape 58 and a series of lacing eyelets 59 are provided through the extra thickness of lacing strip 56 and the fabric tape 58. The eyelets 59 are preferably in a staggered pattern to avoid the risk of ripping along the line of perforations. Identical lacing portions are provided on opposite sides of the boom so that the booms are substantially interchangeable and are symmetrically end to end so that they can be reversed as desired or can be used for either keel or leading edge booms.

The sail 16 that is secured to the frame formed by the leading edge boom 13 and the keel boom 14 is in the form of two abuting substantially triangular panels that are secured together along one edge of each panel by a web 61 that lies along the abutment as illustrated in FIGS. 3 and 8. When the sail is assembled on the frame the web 61 lies along the keel boom 14. In the embodiment illustrated in FIG. 8 a lacing strip 62 is stitched to the said adjacent the web 61 for attachment to a lacing strip 56 on the keel boom. Each of the lacing strips 62 has an edge doubled and stitched over a fabric reinforcing tape 63. A plurality of staggered lacing eyelets (not shown in FIG. 8) are provided along the edge through the doubled lacing strip fabric and the reinforcing tape. The sail 16 is secured to the keel boom 14 by braided nylon lacing 64 fastened between the lacing strip 56 on the keel boom and the lacing strip 62 on the sail. Two such lacings 64 are provided, one on each side of the keel boom and the web 61 so that the loads are symmetrical.

Along the leading edge of the sail there is a lacing portion having the sail fabric doubled and stitched over a fabric reinforcing strip 66 as illustrated in FIGS. 7 and 9. The lacing portion on the leading edge of the sail is attached to one of the lacing strips 56 on the leading edge boom 13 by braided nylon lacing 57. It is preferred to have the sail pass over the leading edge boom and be secured to the far side thereof from the keel boom. Since the leading edge booms 13 have but a single portion of sail secured thereto, one of the lacing strips 56 on a typical boom is unused as can be seen in FIG. 9.

It is preferred to lace the booms to the sail in the manner illustrated so that manufacturing variations in the sail and booms can be readily accommodated and the booms are fully interchangeable. It is also found that such a compliant connection as the illustrated lacing distributes loads so that no highly localized loads are applied to the booms. This minimizes the bending moments on the booms so that the diameters of the booms and the pressurization required in order to maintain a required stiffness are minimized.

As has been mentioned hereinabove a plurality of leading edge gussets 17 are secured adjacent each leading edge of the said 16 for supporting the payload from the leading edge of the wing. Similarly a plurality of keel gussets 18 are secured directly to the sail adjacent the web 61 that lies over the keel boom 14. There are keel gussets 18 on either side of the keel boom and each keel gusset on one side and a corresponding keel gusset on the other side are both attached to a single keel riser line 24 or 27 for supporting the payload.

Each of the leading edge gussets 17 and keel gussets 18 is substantially identical with the difference lying only in the angle of application of loads and the corresponding angular relation of the sides of the gusset. Thus for purposes of exposition a single leading edge gusset is described herein and it will be understood that all of the leading edge and keel gussets are substantially similar in construction and arrangement.

Thus there is illustrated in FIGS. 7 and 9 a leading edge gusset comprising a fabric sheet 68 having a substantially triangular shape. The gusset which might also be known as a splice sheet is stitched to the sail around the portion of the periphery of the gusset in contact with the sail. A fabric load bearing tape 69 is stitched along two edges of the gusset sheet 68 and extends from one point of the substantially triangular sheet in the form of an open loop 71. The extending point of the gusset is beyond the edge of the said panel and is employed for securing a riser line 19 which preferably has a loop 72 interlocked with the open loop 71 on the gussets. The load applied by way of the riser line 19 is thus applied to the tape 69 which distributes the load on the gusset sheet 68. The gusset sheet 68 is stitched directly to the sail and not to the inflatable boom. This tends to minimize the localized loads on the booms and minimizes bending moments.

*Control platform*

Figure 14:
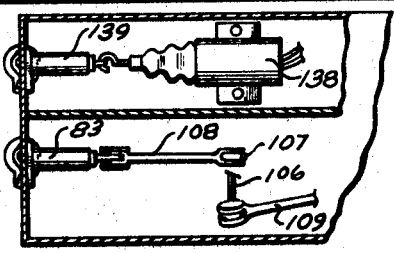
FIG. 14 is a partial cross-section of the payload supporting platform of FIG. 10.

A payload supporting platform 11 providing control mechanisms for a flexible wing vehicle as illustrated in FIGS. 13–16. The platform contains the folded wing before deployment and has reefing arrangements employed in the deployment method hereinabove described. Means for controlling the flight of the vehicle after deployment are also in the platform 11. FIG. 13 is a top cross-sectional view of a typical platform found useful in the practice of this invention. Arranged around the side of the sheet metal platform 11 are a plurality of conventional buckles 78 which are conveniently employed for strapping a payload to the platform. Near the aft corners of the platform eyelets 79 (FIG. 15) are provided for fastening the aft leading edge link lines 18 that are attached to the ring 21 and thence to the leading edges of the flexible wing. A centrally located eyelet 81 on the top of the platform is used for attaching the aft keel link line 29. In FIGS. 13–15 various cable attachment points are described and illustrated, however, the cables or lines themselves are not shown in these figures. It will be understood that connection to the cable attachment points is by conventional means such as a loop in the end of the cable, a double clew knot, or a ring secured to the cable and that the lines mentioned are those illustrated in FIGS. 1–3. It is preferred that the cable attachment points and the buckles 78 be arranged on common structural members or reinforcing beams for direct transmission of loads from the risers to the payload. This minimizes the stresses on the platform and permits light weight construction.

As has been mentioned, during deployment of a flexible wing from the payload various riser lines are reefed to the control platform temporarily to provide a stable geometry after extraction of the wing from the platform and until a fully inflated gliding configuration is achieved. Thus short boom reefing lines 76 are attached to the control platform by means of latches 82 adjacent the aft corners of the control platform. Similarly the forward keel link line 26 is temporarily reefed to the control platform by a latch 83 (hidden in FIG. 13). The latches 82 and 83 are preferably operated by a pulling motion on the axis of the latch for release of the riser lines.

A latch found to be particularly suited to the practice of this invention is illustrated in FIGS. 16 and 17. Details of such a latch are described and claimed in copending U.S. patent application, Ser. No. 562,213, entitled "Cable Control," by Donald M. Nelson and assigned to North American Aviation, Inc., the assignee of this invention. A typical latch as illustrated in FIGS. 16 and 17 comprises a cylindrical housing 86 that is secured to a structural portion of the control platform 11 by a support frame 87. A cylindrical plunger 88 is mounted in the housing 86 for slidable motion along the axis thereof. A spring 89 acts on the plunger 88 to urge it into a latching position at one end of its normal travel. An axial pull on the plunger 88 compresses the spring 89 and draws the plunger 88 into an unlatched position.

A pair of ears 91 are provided on the latch frame 87 so as to extend outward from the control platform 11. A pin 92 through the ears 91 provides a pivotal support for a catch plate or cam 93. The catch plate 93 has a generally circular shape with an extending tab 94 on one side and a cutaway portion 96 on another side thereof. The cutaway portion 96 provides a shoulder 97 extending inwardly of the circular surface of the catch plate for mating with the plunger 88 when it is in the latching position for preventing rotation of the catch plate in a clockwise direction in the view illustrated in FIG. 16. A slot 98 is provided in the tab 94; and, in the flexible wing vehicle described and illustrated herein, the slot 98 is normally arranged on the downward side of the latch. A ring 99 is provided in the slot 98 and a reefing line 76 (typical) is connected to the ring. A sill 101 is provided on the latch frame 87 so as to provide a closure over the opening of the slot 98. This retains the ring 99 captive in the slot.

During flight of a flexible wing vehicle the boom reefing line 76 has a substantial force directed upwardly and outwardly and this force acts by way of the ring 99 on the catch plate 93 in such a direction as would rotate the catch plate in a clockwise direction in the embodiment illustrated in FIG. 16 if it were not for the plunger 88 in engagement with the shoulder 97. When it is desired to dereef the flexible wing, an axial pull is applied to the end of the plunger 88 by a cable 76 (typical). This force pulls the plunger toward the unlatched position and the end of the plunger comes out of engagement with the shoulder 97. The force on the catch plate 93 by the reefing line 76 rapidly pivots the catch plate so that the slot 98 swings into a position where the ring 99 is free to escape. The tab 94 strikes against the control platform 11 or the frame 87 so that the catch plate does not continue to rotate. The reefing line is thus released and when the pull on the plunger of the latch is released, the plunger rides against the outer circular surface of the catch plate thereby tending by friction to hold the catch plate in the open or unlatched position. This latter feature provides a significant advantage for the described latch since it is not necessary to have access to the interior of the control platform for resetting the latch. All that is necessary for resetting is to insert the ring 99 into the slot 98 and rotate the catch plate by means of the tab 94 in a direction opposite to rotation upon release. When the end of the plunger 88 clears the shoulder 97 the spring 89 forces the plunger into the cutaway portion of the catch plate and the latch is reset for reuse.

It is desirable in deploying a flexible wing from a payload to temporarily reef some of the lines as has been described above. In order to assure orderly deployment the reefing connections should all be released simultaneously. Means are therefore provided on the platform 11 for operating each of the reefing latches at the same time. For this purpose the latches are all connected to a dereefing actuator and roll control motor 103 further described hereinafter. The actuator 103 has a pivotable arm 104 thereon with two control rods, 106 and 107 respectively, attached to the arm so as to move in concert with it. The lower of the two control rods 106 is connected to one arm of a forward bellcrank 108 that has the other arm connected to the dereefing latch 83 that secures the forward keel link line 26 to the control platform. The upper of the two control rods 107 is connected to one arm of a rearward bellcrank 109 that has a cable 111 attached to the other arm. The cable 111 is split into two legs each of which passes over one of a pair of pulleys 112 and thence to one of the latches 82 at the aft end of the control platform. The latches 82 are employed for attaching the boom reefing line 76 during deployment.

Upon initiation of dereefing, the dereefing actuator 103 which can be controlled by a conventional timer or by radioed command, pivots the arm 104 so as to pull on the two control rods 106 and 107 so that the two rods move at the same time. The control rods operate the bellcranks 108 and 109 respectively. The forward bellcrank 108 pulls on the plunger of the reefing latch 83 thereby releasing the forward keel link line 76. Simultaneously the rearward bellcrank 109 pulls on the cable 111 which in turn pulls on the two boom reefing latches 82 thereby releasing the boom reefing lines 76. The three dereefing latches are thus mechanically interconnected and actuated by a common mechanism so that simultaneous action occurs during deployment for high reliability.

As illustrated in FIGS. 19 and 20 the dereefing actuator and roll control motor 103 comprises a conventional reversible electric motor 114 having a splined shaft 115 extending therethrough for obtaining useful rotation. One end of the splined shaft provides rotation for roll control of the vehicle, and the other for dereefing as will be more apparent hereafter. The end of the splined shaft 115 for dereefing actuation has a relief groove 116 beyond the termination of the splines, and a shoulder 117 just beyond the relief groove. A cylindrical housing 118 is secured to the motor 114 and encloses the end of the shaft 115. A raised boss 119 is provided inside the housing at one end thereof so as to provide a single raised point extending inwardly from the end of the housing.

A camming sleeve 121 is inside the housing, and has a splined internal flange 122 at one end thereof as is more clearly illustrated in FIG. 21. The splined flange 122 engages with one end of the splined shaft 115 so as to be driven thereby upon rotation of the motor. At the opposite end of the camming sleeve is the arm 104 to which the control rods 106 and 107 are connected. Also at this opposite end is a camming surface 123 that lies at an angle to the normal to the sleeve axis, that is, the camming surface 123 forms a ramp at the end of the sleeve 121. The camming surface rides on the raised boss 119 in the housing, and is urged thereagainst by a spring 124.

When the actuator 103 is employed for dereefing, the motor 114 rotates the sleeve 121 because of the splined flange 122 mating with the splined shaft. As the sleeve rotates the camming surface 123 rides across the boss 119 so that the sleeve advances along the shaft toward the end thereof under the urging of the spring 124. Rotation of the sleeve pivots the arm 104 and as has been described, this pivoting releases the dereefing latches. After traveling far enough for releasing the latches (about 30°)

the splined flange 122 comes out of engagement with the splined shaft 115 in the relief groove 116, and further rotation of the shaft in either direction has no effect on the sleeve. The arm 104 also contacts a switch 126 to provide a signal that dereefing has been achieved that can be used to stop the motor 114 or for other functions. In order to reset the dereefing actuator, the arm 104 is grasped by hand and the splines reengaged and the sleeve and motor rotated by hand to the starting position. Details of the dereefing actuator and roll control motor are described and claimed in the aforementioned patent application Ser. No. 562,213, entitled "Cable Control."

The end of the shaft 115 extending from the motor 114 on the side opposite from the sleeve has a reel 131 attached thereto that is employed for controlling flight of the vehicle. Cables 22 that are extensions of the forward leading edge link lines are connected to and wound around the reel 131 as is more clearly shown in FIG. 13. The two cables 22 are both wound around the same reel so that rotation thereof pays one end of the cable out at the same time as the other end of the cable is wound up thereby giving control of two cables with a single motor. This bus type of cable arrangement doubles the controlling effect of a given amount of reel rotation since both the right and left sides of a vehicle will be affected in equal and opposite directions. The cable 22, which in the portion within the control box is preferably of steel to avoid chafing problems, is passed over pulleys 132 and through fairings or grommet 133 in the top of the control platform 11. These cables then extend as the forward leading edge link lines 22 to the leading edges of the flexible wing as hereinabove described.

The same motor is employed for dereefing actuation and roll control of the vehicle to save weight and circuit complexity. No problems are encountered in so doing since only a small motor rotation is required for dereefing and the leading edge risers are slack at this time during deployment. Thus the small amount of reel rotation merely changes the lengths of cables that are already slack and no change occurs in the flight condition of the vehicle. The total motion of the cable is small enough that no tangling problems have been encountered.

Control of vehicle

Figure 23:
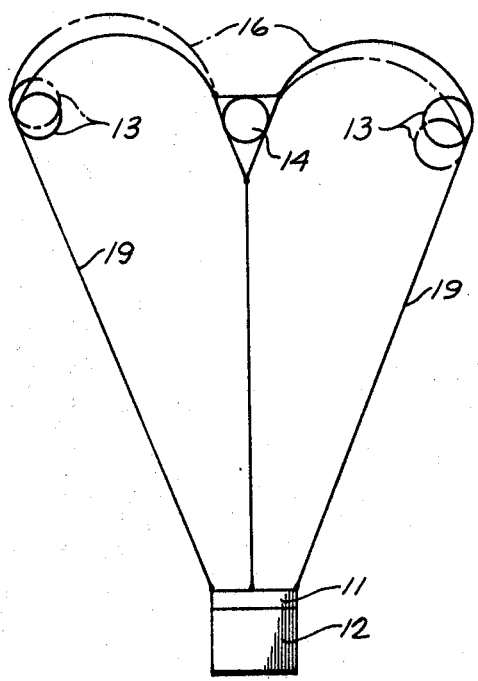
FIG. 23 illustrates schematically a transverse cross section of a flexible wing vehicle.

In normal gliding flight the aerodynamic vehicle herein described is substantially symmetrical in a transverse cross-section as shown schematically in FIG. 23. As illustrated therein the leading edge riser lines 19 (typical) are of equal length and the wing itself has bilateral symmetry. When it is desired to turn in flight, the roll control motor is actuated thereby driving the reel to which the leading edge riser lines are connected by way of the forward leading edge link line 22. In so doing the riser lines on one leading edge boom are extended and those on the other leading edge boom are retracted by a similar amount as illustrated in phantom in FIG. 23. The degree of motion has been exaggerated somewhat for purposes of illustration. This permits one of the leading edge booms to rise relative to the keel boom and pulls the other leading edge boom downward relative to the keel boom, and the keel boom does not move relative to the payload. This makes the wing asymmetrical relative to the payload and shifts the angle of application of aerodynamic forces so as to cause the vehicle to roll and turn. Not only do the leading edge booms shift vertically relative to the keel boom but they also shift laterally relative to the keel boom due to the different angles of application of forces when the riser lines have a changed length. Both of these shifts are possible because of the articulated apex hereinabove described and both tend to warp the sail on the flexible wing. It is found with a flexible wing vehicle of the type described and illustrated herein that a total motion of about 6 to 8 inches on each of the control cables can turn the aerodynamic vehicle during gliding flight with a turn radius of about 100 feet.

Figure 24:
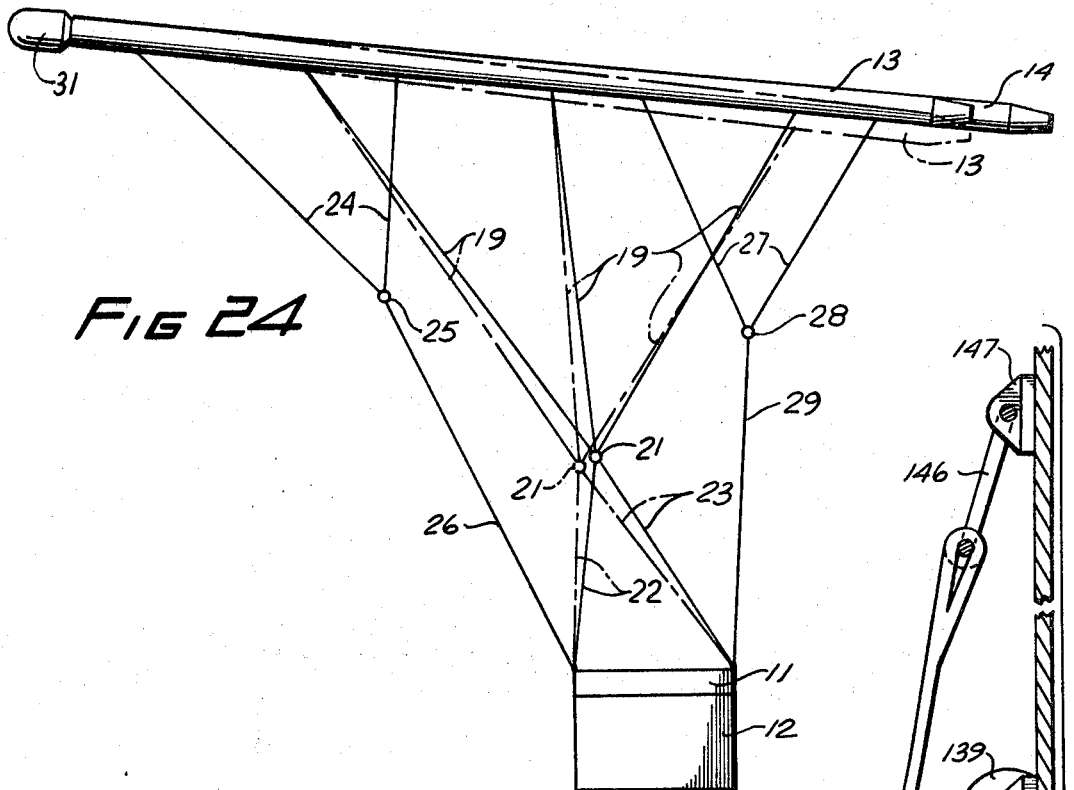
FIG. 24 shows schematically a side view of a portion of a flexible wing vehicle.

The changed position of the lines when a typical flexible wing vehicle is caused to turn is illustrated in FIG. 24. A side schematic view of the vehicle is illustrated in normal straight flight and also, in phantom, there is shown the positions of one set of leading edge riser lines when the vehicle is controlled for turning. As mentioned hereinabove, control is obtained by retracting one forward leading edge link line 22 and extending the other. The change position illustrated in FIG. 24 is a retracted position, however, the opposite condition can readily be provided by one skilled in the art and is not presented in FIG. 24 for purposes of clarity.

When the forward leading edge link line is retracted the ring 21 is shifted toward the control platform 11 at the forward end, but since the aft leading edge link line 23 is of fixed length, the ring stays the same distance from the aft end of the control platform, i.e. it moves along an arc around the aft corner.

As mentioned hereinabove the triangular array of leading edge riser lines 19 and the leading edge boom 13 can be considered a rigid body. The leading edge boom is connected to the keel boom 14 at the forward end apex of the wing. Hence any motion of the pseudo-rigid body is around the apex and the ring 21 tends to move along an arc around the apex. Obviously the two arcs cannot be coextensive and the ring cannot move along both of them simultaneously. It has been found that locating the ring 21 about 60 percent of the wing to payload distance below the wing permits shifting of the ring along a path most nearly approximately the two arcs, thereby minimizing changes in loads on the lines and changes in bending moments on the booms. The ring can shift along a path that is not exactly on the two arcs because the system is not completely rigid. There is appreciable elasticity in the nylon riser lines and some flexibility in the boom that readily accommodates any slight deviation from the arcuate path. Thus, for example, the maximum bending of a 23 foot long boom, assuming no line stretch, is less than one inch and this is well within the capability of an inflatable fabric boom.

Another factor mitigating stress is the complex spatial relation of the booms, payload, and risers. Thus when the control lines are retracted, the leading edge boom not only shifts downward, it also shifts inward and because of the angle of application of forces by the lines, there is a yawing of the box relative to the wing. The yaw is desirable from quite another point of view since it is often convenient to operate a flexible wing vehicle with a homing guidance system mounted on the control platform. The direction of yaw causes the control platform to lead the wing in turning so that a minimum error is detected before the wing has reached the final flight attitude, and "hunting" of an automatic homing system is minimized.

In order to obtain extremely low landing velocities, it is desirable to increase the lift and drag of the vehicle just before ground contact. This reduces both the horizontal and vertical velocity components and permits the payload to contact the ground at a minimum speed. This flare maneuver is accomplished in much the same manner as in other aerodynamic vehicles by increasing the angle of attack of the lifting surface. This is accomplished in the flexible wing vehicle herein described by an incremental extension of the riser lines leading to the forward end of the vehicle to change the effective length of the lines. An incremental increase is employed because of the simplicity of this type of operation, however, it will be readily appreciated that a reel mechanism or the like could be employed for proportional control of the angle of the attack of the flexible wing.

A typical flare control employs a switch 136 (FIG. 1) which is suspended below the control platform by an electrical cable 137 that in a preferred embodiment is about 40 to 50 feet long. The switch 136 is actuated upon contact with the ground as the vehicle approaches a landing. Closing of the switch 136 operates a solenoid 138 (FIG. 13) that is directly connected to a flare latch 139. The flare latch is preferably substantially the same as the dereefing latches 82 and 83 hereinabove described. The forward keel link line 26 is connected to the flare latch 139 and is released by the latch to give an incremental extension in length of 12 to 18 inches for flaring the flexible wing. It is found in flexible wing vehicles of the type described and illustrated that initiation of flare about 40 feet above the ground substantially reduces both the horizontal and vertical velocity of the vehicle and permits very gentle landing of the payload. On extension of the forward riser lines the angle of attack of the flexible wing increases and it is also found that the angle between the booms increases so that the wing has a larger platform area for substantially increased drag. Landing speeds of less than ten feet per second have been obtained with a vehicle of this type with a 500 pound payload.

Figure 22:
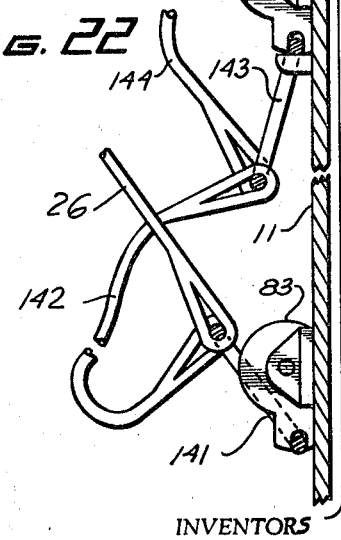
FIG. 22 illustrates reefing connections for a riser line.

A specific arrangement for connecting the forward keel link line 26 to the control platform is illustrated in FIG. 22 which shows the cable position before dereefing when the vehicle is in the flight condition illustrated in FIG. 11. The taut link line 26 is connected to a ring 141 that is held in the slot of the dereefing latch 83 on the forward end of the control platform. A length of cable 142 is provided between the ring 141 and a second ring 143 that is held captive in the flare latch 139. Another length of cable 144 is also connected to the ring 143 in the flare latch and is also connected by way of a ring 146 to a fixed eyelet 17 on the forward end of the control platform. In a preferred embodiment the two lengths of cables 142 and 144 each have an effective length of about 12 to 18 inches.

During the time that the link line 26 is reefed there exists a substantial tension thereon and the line is retained by the dereefing latch 83. Upon release of the dereefing latch as described above, the tension on the link line 26 is transmitted by way of the ring 141 to the short cable 142 which is secured to the control platform by the ring 143 and the flare latch 139. Thus the effective length of the forward link line is increased by about 12 to 18 inches upon release of the dereefing latch 83. Similarly when the flare latch 139 is released the tension on the link line is transmitted by way of the two short cables 142 and 144 to the fixed eyelet 147 on the control platform. This again increases the effective length of the forward keel link line by about 12 to 18 inches so that the flexible wing flares immediately prior to contact with the ground. Such a dereefing and flare control arrangement has been found highly satisfactory and reliable in repeated operation.

Obviously many modifications and variations of this invention may be practiced in light of the above teachings. It is therefore to be understood that within the scope of the appended claims the invention may be practiced otherwise than as specifically described.

What is claimed is:

1. A dirigible flexible wing vehicle comprising:
   a payload;
   a wing member, said wing member comprising a trifurcated frame including a pair of leading edge booms and a keel boom therebetween, said booms connected to each other at one end thereof for universal relative angular motion and a flexible wing member extending between and secured to said booms; and
   means for steering the vehicle, said means comprising a plurality of flexible lines suspending the payload from said wing member; and
   means for selectively controlling the lengths of those lines connected between the payload and at least one of the leading edge booms to effect steering of the vehicle by varying the position of at least one of the leading edge booms as a unit relative to the keel boom.

2. A flexible wing vehicle as defined in claim 1 wherein the flexible lines include:
   a plurality of riser lines connected to spaced points on said wing member adjacent one of said leading edge booms, and
   a plurality of link lines connected to spaced points on the payload, at least a portion of said link lines being of selectively variable length; and further comprising
   a common interconnection point among the riser lines and the link lines.

3. A flexible wing vehicle as defined in claim 2 wherein:
   the riser lines are in a substantially triangular array with an apex of the triangle at the common interconnection point; and
   at least a portion of the link lines are in a substantially triangular array with an apex of the triangle at the common interconnection point so that the angle between the payload and the leading edge boom can vary without changing the shape of the triangular array of riser lines.

4. A flexible wing vehicle as defined in claim 3 wherein said plurality of lines includes:
   a plurality of keel lines connected to spaced points on said wing member adjacent the keel boom;
   means for selectively varying the effective length of at least a portion of said keel lines for varying the relative positions of the payload and the wing member for pitch control.

5. A flexible wing vehicle comprising:
   a crowfoot shaped wing member comprising a rigidifiable trifurcated frame including a pair of leading edge booms and a keel boom therebetween, said booms being interconnected at one end thereof forming a leading end apex for said wing member and diverging at the other end to form the crowfoot shape, and a flexible sail attached to each of said booms along the length thereof to form a lifting surface;
   a rigid payload arranged generally below said wing member;
   a flexible riser line means of substantially fixed length interconnecting said wing member and said payload for supporting said payload;
   a first plurality of edge riser lines attached to said wing member at longitudinally spaced points adjacent one of said leading edge booms, said edge riser lines being interconnected at a first single point between said wing member and said payload;
   a first controllably variable length link line interconnecting the first single point and the payload;
   a second plurality of edge riser lines attached to said wing member at longitudinally spaced points adjacent the other of said leading edge booms, said edge riser lines being interconnected at a second single point between said wing member and said payload; and
   a second controllably variable length link line interconnecting the second single point and the payload, whereby change in length of at least one of the link riser lines will steer the vehicle by varying the angular position of at least one of the leading edge booms relative to the keel boom, whereby variation of length of at least one of said link lines controllably distorts said wing for steering.

6. A flexible wing vehicle as defined in claim 5 wherein said first and second link lines are each connected at one end of said payload, and further comprising:
   winch means on said payload for controllably varying the relative lengths of said link lines;
   a first fixed length link line interconnecting the first single point and the other end of said payload; and
   a second fixed length aft link line interconnecting the second single point and the other end of said payload.

7. A flexible wing vehicle as defined in claim 6 wherein said winch means comprises:
   a winch on said payload, said variable length link lines each being connected to said winch so that extension of one of said link lines corresponds to retraction of the other of said link lines;
means for routing said first variable length link line to a forward corner of said payload; and
means for routing said second variable length link line to another forward corner of said payload.

8. A flexible wing vehicle as defined in claim 7 wherein the interconnection between said booms comprises:
first pivot means connecting said leading edge booms to said keel boom for pivotal movement of said booms in a plane defined by the keel boom and at least one of the leading edge booms; and
second pivot means connecting said leading edge booms to said keel boom for pivotal movement of said booms out of a plane defined by the keel boom and at least one of the leading edge booms, whereby said booms are mutually articulatable and bending moments at the ends of the booms are avoided.

9. A flexible wing vehicle as defined in claim 8 further comprising:
a forward pair of keel riser lines attached directly to said sail adjacent to and on both sides of said keel boom at longitudinally spaced points thereof relatively nearer to the forward end of said keel boom, said forward pair of keel riser lines being interconnected at a first common point between said wing member and said payload;
a forward link line interconnecting the first common point and the forward end of said payload;
a rearward pair of keel riser lines attached directly to said sail adjacent to and on both sides of said keel boom at longitudinally spaced points thereof relatively further from the forward end of said keel boom, said rearward pair of keel riser lines being interconnected at a second common point between said wing member and said payload;
a rearward link line interconnecting the second common point and the rearward end of said payload;
means on said payload for selectively controlling the effective length of said forward link line, whereby the angle of attack of said wing member is controlled; and wherein
said booms are substantially similar and each of said booms comprises an elongated flexible inflatable tube; a rigid end closure on each end of said tube; and compliant means for attaching said tube to said sail along the length of said boom; and
said edge riser lines are attached directly to said sail adjacent said leading edge booms at longitudinally spaced points thereof, whereby loads are supported by the sail and distributed to said booms by the sail, and application of concentrated loads to said booms is avoided.

10. A flexible wing vehicle as defined in claim 9 wherein said means for selectively controlling the effective length of said forward link line comprises:
latch means for temporarily limiting the length of said forward link line and for incrementally lengthening said forward link line; and
means for actuating said latch means at a selected altitude so that the angle of attack of said wing member is increased for landing flare.

11. A flexible wing vehicle as defined in claim 5 wherein the interconnection between said booms comprises:
first pivot means connecting each of said leading edge booms to said keel boom for pivotal movement of said booms in a plane defined by the keel boom and at least one of the leading edge booms; and
second pivot means connecting said leading edge booms to said keel boom for pivotal movement of said booms out of a plane defined by the keel boom and at least one of the leading edge booms, whereby said booms are mutually articulatable and bending moments at the ends of the booms are avoided.

12. A flexible wing vehicle as defined in claim 11 wherein said booms are substantially similar and each of said booms comprises:
an elongated flexible inflatable tube; and
compliant means for attaching said tube to said sail along the length of said boom; and further wherein:
said edge riser lines are attached directly to said sail adjacent said leading edge booms at longitudinally spaced points thereof; and further comprising
a plurality of keel riser lines attached directly to said sail adjacent said keel boom at longitudinally spaced points along the length thereof, a portion of said keel riser lines being attached to said payload forward of the center thereof and a portion of said keel riser lines being attached to said payload rearward of the center thereof, whereby loads are supported directly by the sail and distributed to said booms by the sail, and application of concentrated loads to said booms is avoided.

13. A flexible wing vehicle as defined in claim 5 further comprising:
a plurality of keel riser lines attached to said wing member at longitudinally spaced points adjacent said keel boom, a portion of said keel riser lines being attached to said payload forward of the center thereof, and a portion of said keel riser lines being attached to said payload rearward of the center thereof.

14. A flexible wing vehicle as defined in claim 13 wherein said first single point and said second single point are each about 60 percent of the payload to wing distance below the wing; and wherein said keel riser lines comprise:
a forward pair of keel riser lines attached to said wing member relatively nearer to the forward end of said keel boom, said forward pair of keel riser lines being interconnected at a first common point between said wing member and said payload;
a forward link line interconnecting the first common point and the forward end of said payload;
a rearward pair of keel riser lines attached to said wing member relatively further from the forward end of said keel boom, said rearward pair of keel riser lines being interconnected at a second common point between said wing member and said payload; and
a rearward link line interconnecting the second common point and the rearward end of said payload.

15. A flexible wing vehicle as defined in claim 14 further comprising:
means on said payload for temporarily limiting the length of said forward link line and for incrementally lengthening said forward link line, whereby the angle of attack of said wing member is increased for landing flare.

References Cited
UNITED STATES PATENTS

| 3,141,640 | 7/1964 | Sutliff et al. | 244—138 |
| 3,198,458 | 8/1965 | Fink | 244—49 |
| 3,212,730 | 10/1965 | Tschudy et al. | 244—1 |
| 3,275,271 | 9/1966 | Forehand | 244—138 |
| 3,310,261 | 3/1967 | Rogallo et al. | 244—44 |

OTHER REFERENCES

Aviation Week & Space Technology, Jan. 27, 1964, cover page and p. 89.

MILTON BUCHLER, *Primary Examiner.*

B. BELKIN, *Primary Examiner.*